(12) United States Patent
Chang (10) Patent No.: US 7,172,744 B2
(45) Date of Patent: Feb. 6, 2007

(54) PROCESS FOR MANUFACTURING HIGHLY CONCENTRATED HYDROXYLAMINE

(75) Inventor: Chin-Hsiung Chang, Palatine, IL (US)

(73) Assignee: BASF Aktiengesellschaft, Ludwigshafen (DE)

( * ) Notice: Subject to any disclaimer, the term of this patent is extended or adjusted under 35 U.S.C. 154(b) by 336 days.

(21) Appl. No.: 10/487,592

(22) PCT Filed: Sep. 3, 2002

(86) PCT No.: PCT/EP02/09811

§ 371 (c)(1),
(2), (4) Date: Feb. 24, 2004

(87) PCT Pub. No.: WO03/022738

PCT Pub. Date: Mar. 20, 2003

(65) Prior Publication Data

US 2004/0213725 A1    Oct. 28, 2004

(51) Int. Cl.
C01B 21/20    (2006.01)

(52) U.S. Cl. .................................................... 423/387

(58) Field of Classification Search .................. 423/387
See application file for complete search history.

(56) References Cited

U.S. PATENT DOCUMENTS

| | | | |
|---|---|---|---|
| 4,147,623 A | * | 4/1979 | Koff et al. .................. 210/672 |
| 4,202,765 A | | 5/1980 | Koff et al. |
| 4,335,091 A | * | 6/1982 | Scholz et al. ............... 423/476 |
| 5,318,762 A | * | 6/1994 | Cawlfield et al. ........... 423/387 |
| 5,762,897 A | | 6/1998 | Chang et al. |
| 5,788,946 A | * | 8/1998 | Riddle et al. ............... 423/387 |
| 5,872,295 A | | 2/1999 | Michelotti et al. |

FOREIGN PATENT DOCUMENTS

EP    237 052    9/1987

* cited by examiner

Primary Examiner—Wayne A. Langel
(74) Attorney, Agent, or Firm—Novak Druce & Quigg LLP (57) ABSTRACT

An improved ion exchange process for manufacturing and concentrating hydroxylamine from an aqueous solution comprising hydroxylammonium ion and counter anions is disclosed. The process involves the use of an aqueous hydroxylamine wash step which assists in controlling the processing temperature and leads to a more concentrated, purified aqueous hydroxylamine solution.

17 Claims, 5 Drawing Sheets

PROCESS FOR MANUFACTURING HIGHLY CONCENTRATED HYDROXYLAMINE

BACKGROUND OF THE INVENTION

1. Field of the Invention

This invention relates to a process for producing hydroxylamine, and more particularly, to such process utilizing an ion exchange resin to produce purified, concentrated solutions of hydroxylamine free base.

2. Description of the Related Art

Hydroxylamine is prepared commercially by the Raschig process or variations thereof in which ammonium or sodium nitrite is reacted in aqueous solution with ammonium or sodium bi-sulfite and sulfur dioxide and the resulting disulfonate salts are subsequently hydrolyzed to a solution containing essentially hydroxylammonium sulfate, sulfuric acid, ammonium sulfate and/or sodium sulfate plus minor amounts of the corresponding nitrates. This solution can be used, after neutralization with ammonia, as a source of hydroxylamine or pure hydroxylammonium salts from the mixture.

One method of obtaining pure hydroxylammonium salts consists of using a hydroxylammonium containing mixture to synthesize an oxime from a ketone, separating the oxime from the spent solution and hydrolyzing this oxime with a strong mineral acid to recover hydroxylammonium salt and the ketone which can be recycled. This method uses long periods of heating for the hydrolysis and requires expensive equipment for the separation of the oxime from the spent solution and of the hydroxylammonium salt from the ketone. Moreover, salts of hydroxylamine with weak or oxidizing acids cannot be prepared by this method because these acids either do not effect hydrolysis of oximes or decompose the hydroxylammonium salt formed during hydrolysis. Salts of such acids can be prepared by neutralizing cold solutions of hydroxylamine with the corresponding acid.

Heinz Holsapfel in Z. Anorg. und Allgem. Chemie, Vol. 288, page 28 (1956) describes the preparation of hydroxylamine from hydroxylammonium salts by employing an anion exchange resin in the OH form. This publication does not relate to the separation of hydroxylamine from solutions containing other cations. As disclosed in U.S. Pat. No. 3,508,864 issued Apr. 28, 1970 to Wallace T. Thompson et al., hydroxylammonium perchlorate can be produced either by liberating hydroxylamine from a hydroxylammonium salt by passage through an anion exchange resin and neutralizing with perchloric acid, or by absorbing hydroxylammonium ion an a cation exchange resin and then passing perchloric acid through the resin. This method does not separate hydroxylamine from other cations. A cation exchange method is described by Earl. J. Wheelwright in Industrial Engineering Chemistry Process Design Development, Vol. 16, No. 2 (1977), page 220 for the preparation of hydroxylammonium nitrate. This method does not separate hydroxylamine from other cations and moreover the resulting solution of hydroxylammonium nitrate contains significant amounts of nitric acid.

Other methods for manufacturing, recovering, and concentrating hydroxylamine solutions and hydroxylammonium nitrate are known in the art. U.S. Pat. No. 5,213,784 discloses a process for producing concentrated purified hydroxylammonium nitrate. The process involves admixing nitric acid having a concentration less than about 70% to solutions containing excess hydroxylamine. The process avoids spontaneous decomposition of the product.

U.S. Pat. No. 4,725,360 discloses a process for recovering hydroxylamine from waste water in the form of hydroxylammonium sulfate. The process consists of passing the waste water over a strongly acidic ion exchanger and then eluting hydroxylamine associated with the ion exchanger with sulfuric acid.

U.S. Pat. No. 4,202,765 discloses a method for purifying hydroxylamine using anion exchanger. The process consists of passing a hydroxylamine containing solution across a bed of cationic exchange resin and desorbing absorbed hydroxylamine using a monovalent amine or hydroxide base.

The prior art describes methods for preparing hydroxylamine and hydroxylammonium salts, but there is still a need for a simple, inexpensive, and continuous process for separating hydroxylamine from solutions containing ionic contaminants. There is also a great need for a process that is capable of producing a hydroxylamine solutions containing essentially no anion impurities such as sulfates.

SUMMARY OF THE INVENTION

This invention relates to a process for producing hydroxylamine, and more particularly, to such process utilizing ion exchange. Additionally, the process employs various processing steps whereby a concentrated solution of hydroxylamine is obtained in a purified state.

DESCRIPTION OF THE DRAWING

The present invention will be more readily understood by reference to the following drawing taken in conjunction with the detailed description, wherein.

DETAILED DESCRIPTION OF THE INVENTION

This present invention rates to an ion-exchange process for manufacturing hydroxylamine from an aqueous solution including hydroxylammonium ion and ionic contaminants such as $H^+$, $NH_4^+$, metal and sulfate ions.

The ion-exchange process of this invention is useful for producing a high purity aqueous hydroxylamine solution for subsequent manufacture of hydroxylamine salts such as hydroxylamine nitrate as well as hydroxylamine sulfate, and other hydroxylamine salts for various intermediate and end uses. An additional advantage of the process of this invention is its ability to produce a purified aqueous hydroxylamine product that is essentially free of cationic contaminants as well as anionic contaminants such as sulfate ion. The term "essentially free" as used herein, refers to a purified aqueous hydroxylamine product that has less than 400 ppm anionic contaminants such as sulfates and preferably 200 ppm or less of anionic contaminants. The term "essentially free" when used to describe ionic contaminants means less than 200 ppb ionic contaminants including all metal cations.

The ion exchange process of this invention is useful for purifying and concentrating hydroxylamine from hydroxylammonium ions produced in a variety of processes. Such processes are disclosed and described, for example, in U.S. Pat. Nos. 5,213,784 and 4,491,567, which describe processes for producing hydroxylammonium ion salts such as hydroxylammonium nitrate (HAN) and hydroxylammonium sulfate (HAS), and which are incorporated herein by reference in their entirety. A common process for preparing a hydroxylammonium ion containing solution is the Raschig process. The Raschig process produces an aqueous solution comprising hydroxylammonium ions, hydrogen ions, ammonium ions, and sulfates.

The process of this invention is useful for producing a purified and concentrated aqueous hydroxylamine solution from any aqueous hydroxylammonium ion containing solution, including, but not limited to, Raschig solutions, HAN solutions and HAS solutions. However, the process of this invention will generally be described in the context of purifying and concentrating hydroxylamine from the aqueous hydroxylammonium ion containing solution product of the Raschig process, and HAS solutions.

The process of this invention uses an ion-exchange resin in a container, e.g. in column form, loaded with a cation exchange resin to bind to the hydroxylammonium ion in order to accomplish hydroxylamine purification and concentration. A suitable cation exchange resin is selected. All types of cation exchange resins are suitable, e.g., sulfonic, phosphoric or carboxylic types. Sulfonic resins are preferred because they have a high selectivity for hydroxylammonium ion over other cations and anions.

In this inventive ion-exchange process, desorption of the hydroxylammonium ion from the resin which is contained in the exchange resin must be accomplished. This is typically accomplished by employing a suitable base solution, e.g. sodium hydroxide, potassium hydroxide, ammonium hydroxide, etc., that has a higher affinity towards the cationic exchange resin than hydroxylamine.

For displacing hydroxylammonium ion from the resin, any water soluble monovalent amine or hydroxide base can be used. Polyvalent bases are less suitable because their cations have great affinity for the exchange sites of the cationic resin and therefore cannot be readily displaced by hydroxylammonium ion in a subsequent ion-exchange loading cycle. Suitable monovalent bases include, for example, sodium hydroxide, potassium hydroxide, lithium hydroxide and the like; methylamine, ethylamine, dimethylamine, diethylamine, and the like. The preferred base is ammonium hydroxide which has the advantages of being relatively inexpensive, non-toxic, of low molecular weight, and volatile. Moreover, the by-product obtained when ammonia is used as a base for the recovery of hydroxylamine from a mixture of sulfate salts is ammonium sulfate, which is valuable as a fertilizer. A most preferred desorbent base is an aqueous ammonia solution having an ammonia concentration of at least 30% and preferably a concentration of at least 40%.

The volatility of ammonia allows for the use of a slight excess of ammonia in the desorption step in order to displace hydroxylamine completely from the resin because small amounts of ammonia that will contaminate the product hydroxylamine (less than about 3% during this operation can easily be removed by evaporation. Furthermore, any product contaminated with an unacceptable level of ammonium ion can be recycled to feed the stream. It has been found, however, that it is possible to obtain essentially ammonia-free and ionic contaminant free hydroxylamine solutions directly from the resin using a deficient amount of ammonia to displace hydroxylamine.

The aqueous base solution which is used to desorb hydroxylamine from the ion exchange resin during the desorption step may optionally contain hydroxylamine. When the aqueous base solution includes hydroxylamine, the ion exchange column effluent which is thereafter finally obtained by subsequently rinsing the resin bed with water, contains hydroxylamine at a concentration which is substantially higher than the concentration obtain if no hydroxylamine were present in the aqueous base solution. This effect allows the recovery of relatively concentrated hydroxylamine liquors in a cyclic and/or continuous ion exchange process by simply recycling part of the hydroxylamine product solution to the unloading step of the next cycle after mixing with a base.

The ion exchange process of this invention is conducted in essentially five steps. The first two steps are defined as the "loading steps" and consist of: (1) an ion exchange step in which a hydroxylammonium ion containing solution is passed across the cation exchange resin in order to allow the hydroxylammonium ion to bind to the cation exchange resin; and (2) a wash step whereby deionized water or some other wash solution is directed across the cation exchange resin in order to maximize the association of hydroxylammonium ion with the cation exchange resin. The water wash step also removes any non-exchanged ionic contaminants such as hydrogen ions, ammonium ions, and anionic contaminants, such as anionic sulfates, and metal ions such as calcium ions, sodium ions, ferrous and ferric ions, etc., from the solution filling the void spaces between the cation exchange resin particles, i.e. becomes "associated" with the resin. In addition, the wash water can also be used to adjust the temperature of the resin column before the subsequent desorption step.

The next step is a temperature maintenance step and a concentration enhancing step which comprises a wash of the resin column with an aqueous solution of hydroxylamine (HA) to displace at least a portion of water from the pores of the resin and in the void space between resin particles. It has been found that in order to get pure HA aqueous solutions in concentrations greater than 12–13%, the use of the recycle HA and introduction of a highly concentrated desorbent are essential. The use of highly concentrated desorbent will add to the desorption temperature due to the heat of dilution of the desorbent. The use of recycle HA will keep the processing temperatures, i.e. the temperature of the resin column, at a maximum of 50° C. to 80° C. throughout the entire process. If this temperature is maintained, the thermal decomposition of the resultant HA is minimized and the resultant pure HA product is obtained in an excess of 50% weight percent aqueous solution.

Additionally, it is to be noted that the temperature control, e.g. 50°–80° C., prevents decomposition of the resultant HA, thereby leading to a more pure product. Finally, the utilization of the aqueous HA recycle step maintains the process temperature when the subsequent desorption of the hydroxylammonium ion from the resin is conducted, as discussed hereafter. Such desorption involves an exothermic heat of exchange which is thus modulated by the HA aqueous recycle.

It is to be noted that the aqueous solution of HA is typically obtained by recycling a portion of the hydroxylamine product after the unloading steps hereafter described.

The final step of the process are known as the "unloading steps". The unloading steps are: (4) a desorption step; and (5) a rinse step. As previously discussed, the desorption step uses concentrated aqueous base solution comprising a soluble amine or hydroxide base that has a higher affinity towards the cationic exchange resin than the hydroxylammonium ion. The soluble amine or hydroxide base replaces hydroxylammonium ion an the cationic resin thereby desorbing hydroxylamine and making it available for collecting in the ion exchange column effluent stream. A rinse step follows the desorption step and uses deionized water or some other aqueous rinse solution to elute the desorbed hydroxylamine from the ion exchange column where it is collected in a purified and concentrated product. The rinse step also cleans the resin bed sufficiently so that no liquid phase reactions occur between the desorbent or eluted products and the subsequent feed.

It is to be stressed that unlike previous ion exchange processes, the resultant aqueous HA product contains metallic ion impurities in the range of about 10–20 ppb or below, as compared to other processes which yield a product containing about 5 ppm. And, as previously indicated, unlike other ion exchange processes, a concentration of such product is obtained in the 50% by weight concentration and higher range as compared to a yield of 12–13% by weight concentration.

Each step is described in greater detail below.

The Ion Exchange Step

A feed solution comprising hydroxylammonium ion and ionic impurities such as sulfate or nitrate impurities is fed into and through a column of cation exchange resin during the ion exchange step. The feed solution may include other ionic contaminants such as hydrogen ion, ammonium ion, metal ions, sulfate ion, nitrate ion, chloride ion, and phosphate ion. The type and amount of feed contaminants present will depend largely on the process used to manufacture the hydroxylammonium ion containing feed. However, typically, an aqueous feed solution comprising 20 to 40 weight percent of a hydroxylammonium salt, e.g. a 30 to 35 weight percent hydroxylammonium sulfate (HAS) solution is fed into and through the resin column to form a hydroxylamine loaded resin.

The hydroxylammonium ion fed into the resin packed column is retained by the cation exchange resin until the resin is at least partially saturated with hydroxylammonium ion at which time the hydroxylammonium ion begins to appear in the column effluent and breakthrough is reached. This first method of loading the resin with hydroxylammonium ion until the breakthrough point is reached represents the maximum amount of hydroxylammonium ions that may be quantitatively removed by the cationic exchange resin from the feed solution while minimizing loss of hydroxylammonium ion in the exchange step column effluent. Continuing hydroxylammonium ion feed into the resin packed column after the hydroxylamine breakthrough occurs represents a second method of resin loading whereby hydroxylammonium ion appear in the column effluent stream in progressively larger concentrations until the mole-fraction of hydroxylammonium ion in the effluent approaches the mole-fraction of hydroxylammonium ion in the feed solution. The resin of at this point is essentially at equilibrium with the feed solution and the hydroxylammonium ion loading an the cation exchange resin represents the equilibrium capacity of the resin for hydroxylammonium ion in the presence of excess feed solution.

The second method for loading the cation exchange resin with hydroxylammonium ion described above maximizes the ability of the cationic exchange resin to load hydroxylammonium ion but it produces an unpurified effluent that contains large amounts of desired hydroxylammonium ion. This stream can be recycled to the feed stream if necessary.

It is preferred that the concentration of hydroxylammonium ion in the column effluent during the ion exchange step be minimized while maximizing the loading of hydroxylammonium ion on the cationic exchange resin. This is accomplished by carefully monitoring various parameters of the effluent stream emanating from the ion exchange column during the ion exchange step as described in U.S. Pat. No. 5,762,897, incorporated herein by reference in its entirety.

As previously discussed, the purity and concentration of the resultant HA product is dependent on the temperature of the resin column maintained throughout the process. Hydroxylamine product containing about 10–20 ppb or less of metallic ion impurity can only be obtained if the ion-exchange resin column is maintained at a temperature of 40 to 100° C., preferably about 50° to about 70° C.

The feed linear velocity to and through the ion exchange resin column is typically 2.0 to 5.0 cm/min. If the feed linear is not maintained at this rate the maximum loading of the hydroxylammonium ion an the resin material may not be achieved.

The cation exchange resin that is loaded in an ion exchange column useful in the process of this invention will typically be in particulate form of a granule or a spherical bead. As a result, there are spaces between particles that are occupied or associated by any fluid fed into the ion exchange column during the various process steps. During the ion exchange step, the hydroxylammonium ion, anionic contaminants and cationic contaminants containing feed occupies the void spaces between the cation exchange resin particles and must be flushed from the column prior to desorbing hydroxylammonium ion from the resin. This is done in order to prevent anionic contaminants and other feed contaminants from contaminating the essentially pure aqueous hydroxylamine product.

Accordingly, the resultant hydroxylammonium ion loaded resin is treated with wash water in a washing step to remove any excess of hydroxylammonium ions, e.g. HAS solution and the ionic impurities (anionic and cationic), from the resin to form a purified hydroxylammonium ion loaded resin. Such water washing is typically conducted by the process described in U.S. Pat. No. 5,762,897.

The Temperature Maintenance and Concentration Enhancing Wash

As previously indicated, the temperature of the ion-exchange column must be controlled because of the exothermic heat of exchange which occurs during the ultimate—desorption of hydroxylamine by a base solution. This is accomplished by washing the resultant purified hydroxylammonium ion loaded resin with the aqueous hydroxylamine (HA) solution. The aqueous HA solution is a low concentration solution, typically 25–34 percent by weight of HA.

The HA solution is fed into the ion exchange resin, typically at a linear velocity of 2.0 to 5.0 cm/min, to replace the water contained or associated in the void spaces between the cation exchange resin particles to form a HA loaded resin. The HA wash solution is typically recycled from the resultant HA product after the desorption and rinse step.

Again, it is to be stressed that this process step produces a lower temperature during the subsequent desorption step, which in-turn reduces the decomposition of the HA during its production and ultimately leads to a very pure HA product.

The Desorption Step

The purpose of the desorption step is to feed a desorbent solution into the ion exchange column that includes ions that will preferentially replace hydroxylammonium ion at the cationic exchange resin binding sites thereby eluting hydroxylamine from the resin and from the column. As discussed above, useful desorbents are preferably monovalent amine bases, hydroxide bases, or any combination thereof.

A preferred desorbent is aqueous ammonium hydroxide having a concentration of from about 40 to about 55% by weight. It is most preferred that the aqueous ammonium hydroxide solution have a concentration of at least 45%. The aqueous ammonium hydroxide solution is added to the aqueous HA solution washed ion exchange column at a linear velocity of from 1.5 to 3.5 cm/min. It is important to maintain this low linear velocity of the desorbent solution in order to ensure that hydroxylamine is efficiently and completely desorbed from the cation exchange resin. It is also preferred that a predetermined amount of desorbent be added to the HA solution washed ion exchange column. The amount used will depend upon the ion exchange resin used, the desorbent, and upon the desorbent concentration. For example, where a 48% by weight ammonia solution of aqueous ammonium hydroxide is used as a desorbent, an amount of desorbent equal to 4.5 to 4.7 milliequivalents of ammonium hydroxide per milliliter of resin should be added during the desorption step. The temperature of the desorbent stream can also be adjusted for thermal control of the heat generated during desorption.

At the end of the desorption step, the ion exchange column contains enough desorbent material to desorb bound hydroxylammonium ion from the cation exchange resin. However, the volume of desorbent added to the ion exchange column is generally very small and hydroxylamine does not typically appear in the ion exchange column effluent stream while desorbent is added to the ion exchange column. Therefore, a rinse step is necessary to propel the desorbent through the column so as to completely desorb hydroxylamine from the cation exchange resin and to prepare the cation exchange resin for a subsequent ion exchange step.

The Rinse Step

The rinse step performs two functions. It moves hydroxylamine out of the column and into the effluent stream from the ion exchange column and it prepares the ion exchange column for a subsequent sequence of ion exchange steps. The most important aspect of controlling the rinse step is to determine when to begin collecting a hydroxylamine containing ion exchange column effluent stream product and when to halt collecting the hydroxylamine containing ion exchange effluent stream product in order to maximize the volume and concentration of the hydroxylamine product while minimizing any contaminants in the collected product. It has been discovered that by closely controlling rinse parameters, such as rinse water temperature and linear velocity, and by monitoring the ion exchange column effluent stream parameters such as density, conductivity and pH, the purity can be maximized and the concentration of hydroxylamine in the effluent stream emanating from the ion exchange column during the rinse step can also be maximized.

It is preferred that the rinse step be performed using deionized water having a temperature from about 15° to about 30° C. The warm water increases the kinetics and solubility of unused desorbent and improves desorption kinetics as well. The linear velocity of the rinse water fed to the ion exchange column during the rinse step should be maintained at from about 2.0 to about 5.0 cm/min.

It is preferred that the effluent stream from the exchange column during the rinse step be collected as soon as hydroxylamine is detected in the effluent stream. This occurs by measuring the density, conductivity of the effluent and/or the ion exchange column bed height and/or the effluent stream pH, as described in U.S. Pat. No. 5,762,897.

The cation exchange resin may be employed in the process in the form of a dense compact fixed bed which is alternatively contacted with the feed mixture and desorbent materials. In the simplest embodiment of the invention, the ion exchange resin is used in the form of a single static bed in a semi-continuous process. In another embodiment, two or more and preferably four static ion exchange resin beds are used in association with appropriate valving so that the feed solution may be passed through one or more ion exchange resin containing beds while the desorbent solution is passed through one or more of the remaining static beds. The flow of feed solution and desorbent solution may be either up or down through the resin bed. Furthermore, any conventional apparatus employed in static bed fluid-solid contacting may be used to accomplish the process of this invention.

Counter-current moving-bed or simulated moving-bed counter-current flow systems are preferably used in the process of this invention because they have a much greater separation efficiency than fixed adsorbent bed systems. In the moving-bed or simulated moving-bed process, the adsorption and desorption operations are continuously taking place which allows both continuous production of an extract and a raffinate stream and the continual use of feed and desorbent streams. The raffinate stream comprises feed impurities, desorbent, and so forth and is comparable to the effluent from the ion exchange step described above and to the water wash step effluent stream.

One preferred embodiment of this process utilizes what is known in the art as the simulated moving-bed counter-current flow system, as generally described in U.S. Pat. No. 5,762,897, with modification as to the number of zones.

Where the resultant HA product contains $NH_3$ contamination, e.g. 2–3 weight percent of $NH_3$, the HA product is treated by stripping the $NH_3$ from the solution. The stripping can be achieved by purging with nitrogen or by a vacuum stripping, e.g. at 35°–45° C. at a vacuum of 60–15 mm Hg.

For applications in the semi-conductor industry that requires metal impurities at <5 ppb, an after-treatment process is employed. Conventional methods for the removal of metal ions utilize cation-exchange resins. However, to achieve a high purity product, several types of cation-exchange resins may be required and multi-step processes are used. It has been discovered that metal chelating agents, such as CDTA (cyclohexanediaminotetraacetic acid) and others, are effective for the complexation of metal ions in the presence of highly concentrated HA solutions. Furthermore, the chelating agents are negatively charged.

Therefore, these complexes and metal ions can be removed from the HA solution with an anion-exchange resin. The general method can be applied to the purification of coolants, such as propylene glycol, that are utilized for cooling HA process streams for the safe operation of the HA process.

In addition, a $NH_4$-form of common strong acid cation exchange resin, e.g. Rohm & Haas Amberjet 1500, is used for the removal of alkaline metals, such as Na and K, in the presence of highly concentrated HA without the difficulty of using H+-form of cation exchange resin that generates a lot of heat causing the fast decomposition of HA.

EXAMPLES

Examples 1 and 2

Figure 1:
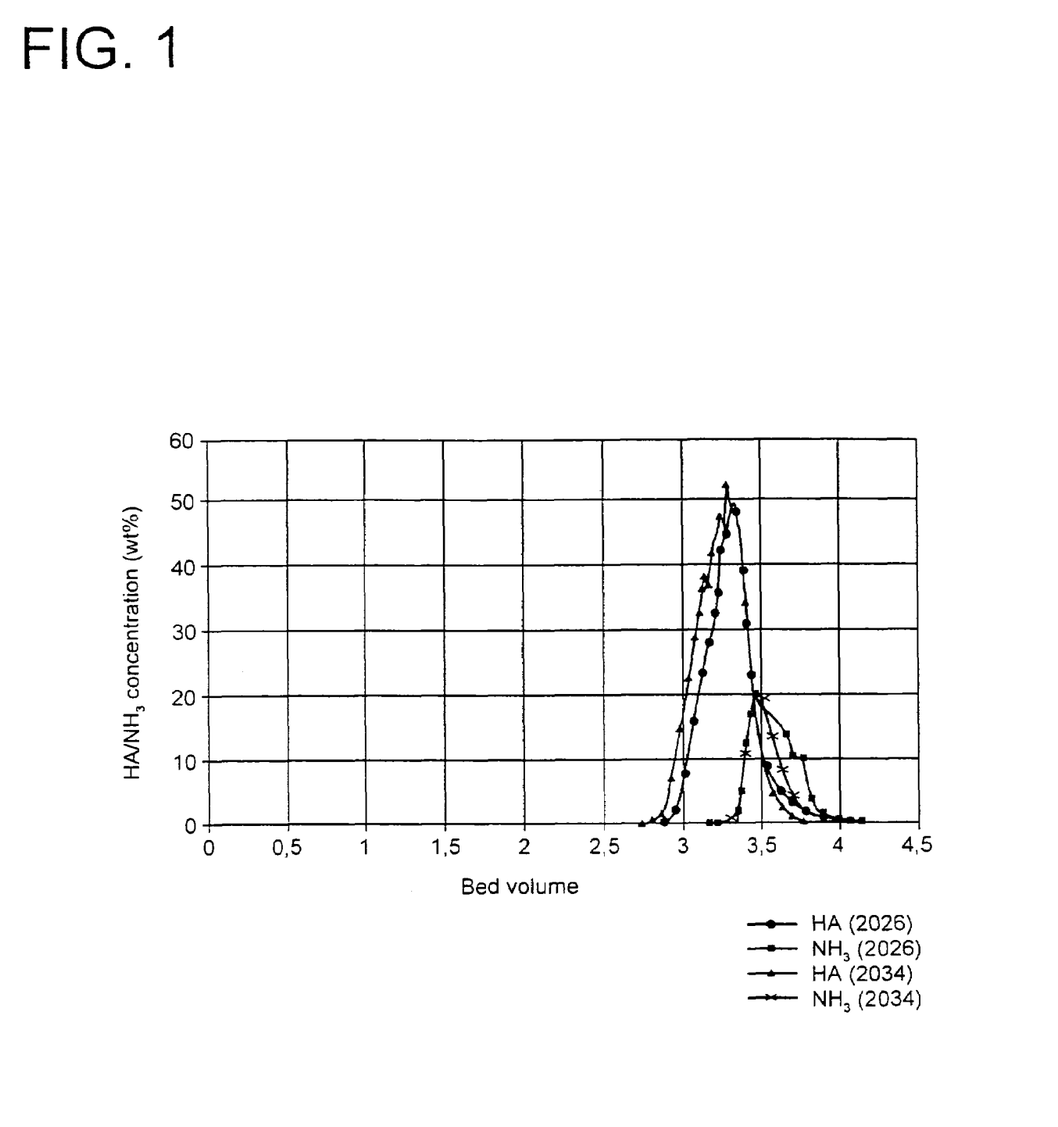
FIG. 1 is a graphical representation of effluent concentrations of hydroxylamine (HA) and $NH_3$ using the present invention with a 1-inch ion exchange column.
Figure 2:
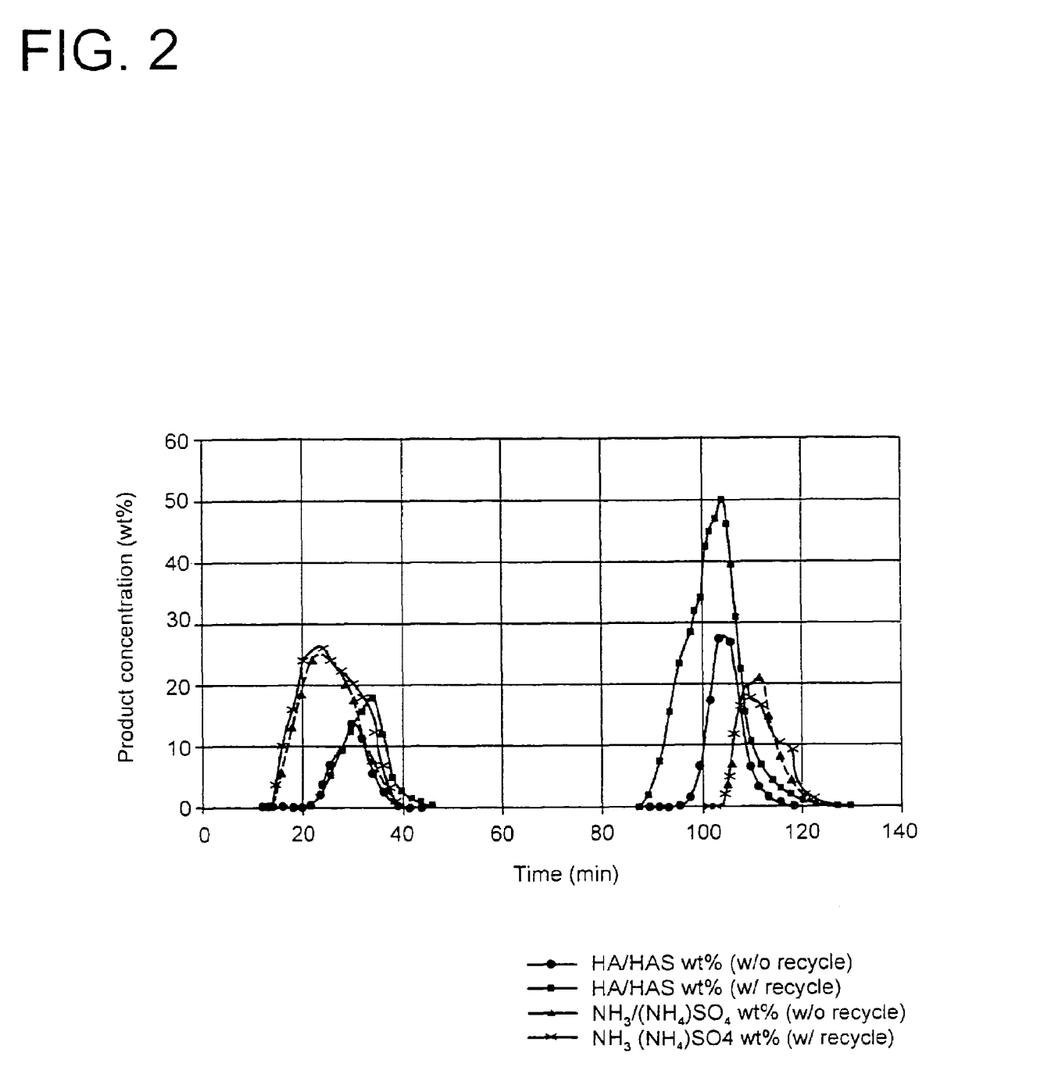
FIG. 2 is a graphical representation of hydroxylamine (HA) product concentration obtained with the present invention with time which reflects the effect of a recycled HA aqueous solution step.
Figure 3:
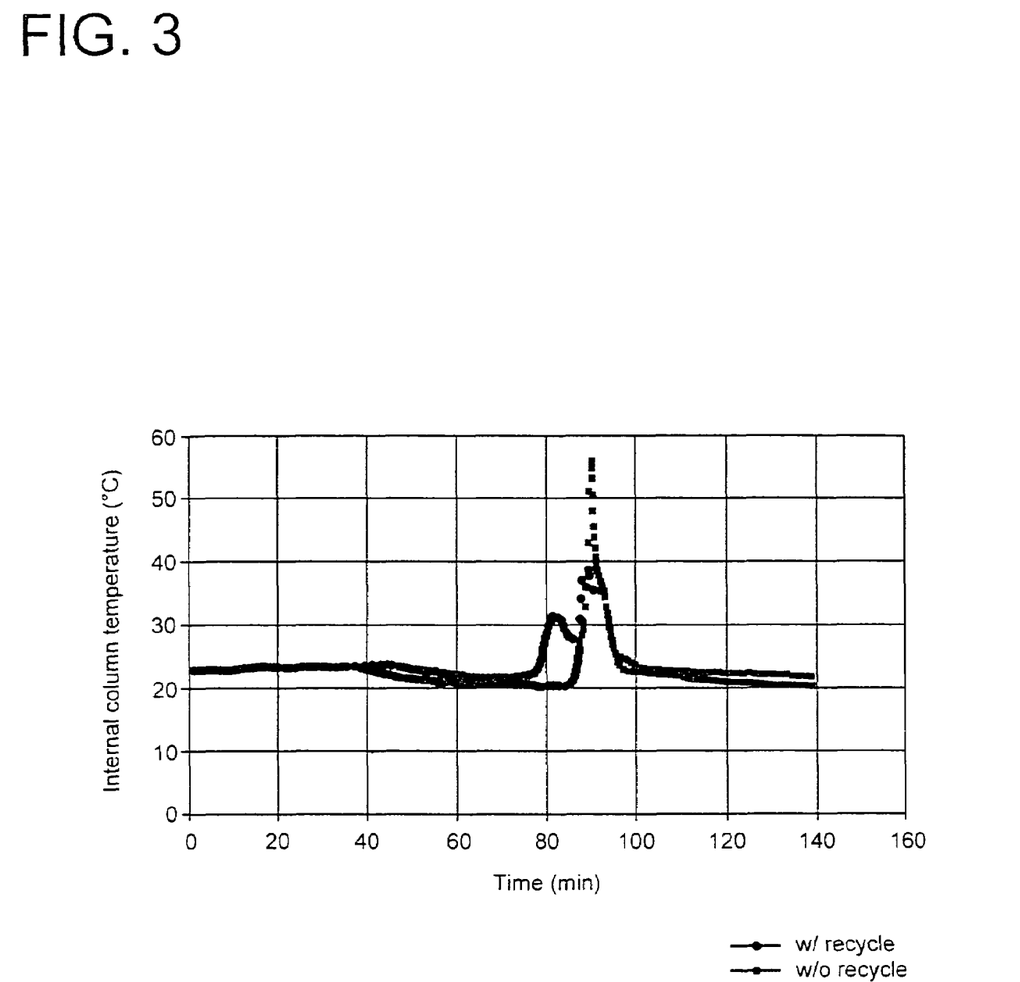
FIG. 3 is a graphical representation of the internal column temperature with time during the production of HA, using the present invention, with and without using a recycled HA solution.

Using a 1-inch ID×37.7" long (PFA) column with 485 $cm^3$ of Rohm and Haas Amberjet brand 1500 resin, Examples 1 and 2 illustrate the invention. The resin was pretreated with 40% sulfuric acid to remove metals on the resin and exchanged to $NH_4^+$-form using a 14% aqueous $NH_3$ solution. 35% by weight aqueous HAS feed was pumped into the column at a flow rate of 16 $cm^3$/min for 14 minutes. This was followed by a water wash at a flow rate of 17 $cm^3$/min for 54 minutes. At the end of the water wash, a recycled HA aqueous solution (34% by weight) was fed into the column at 16 $cm^3$/min for 8 minutes and followed by the introduction of an aqueous $NH_3$ (45% by weight) solution at a flow rate of 17 $cm^3$/min for 5 minutes. A water rinse was followed immediately at a flow rate of 16 $cm^3$/min for 53 minutes. Effluent stream samples were collected every 2 minutes. Concentrations of HA and $NH_3$ in the product recovery region were plotted against bed volume as illustrated in FIG. 1. As a comparison, a test run was conducted under the general procedure described above except that no addition of the recycled HA solution was employed. Effluent product concentrations with and without recycled HA were compared as shown in FIG. 2. A decrease in the internal column temperature with the recycled HA solution is illustrated in FIG. 3.

As shown in FIG. 1, pure products of 48–50% by weight HA and greater are obtained without the need of a concentration step(s).

Examples 3–6

Following the general procedure described in Examples 1 and 2, a 4-inch PFA-lined column was used. The HAS feed flow rate was at 240 $cm^3$/min, wash and rinse water at 240 $cm^3$/min, recycled HA at 220–240 $cm^3$/min and aqueous $NH_3$ at 160–220 $cm^3$/min. The HAS was fed for 16 minutes while wash and rinse water were 52 and 50 minutes, respectively. Scales were used to monitor the weights used for the recycled HA and the aqueous $NH_3$. Parameters used for these examples are summarized in Table 1, below.

TABLE 1

HA Product Yield Efficiency with a Single 4-inch PFA-lined Column

| | Example | | | |
|---|---|---|---|---|
| | 3 | 4 | 5 | 6 |
| Resin volume ($cm^3$) | 8617 | 8770 | 8641 | 8641 |
| HA loaded (g) | 568.7 | 578.8 | 570.3 | 570.3 |
| Recycle HA (g) at 34% | 2240 | 2220 | 2210 | 2200 |
| Aqueous $NH_3$ (g) at 50% | 1330 | 1361 | 1330 | 1283 |
| Product (49%), $cm^3$ | 1006.6 | 980.85 | 1017.2 | 910.2 |
| Gram | 1115.0 | 1066.5 | 1114.3 | 993.3 |
| Net HA (g) | 546.4 | 522.6 | 546.0 | 486.7 |

TABLE 1-continued

HA Product Yield Efficiency with a Single 4-inch PFA-lined Column

| | Example | | | |
|---|---|---|---|---|
| | 3 | 4 | 5 | 6 |
| Recoverable (40% HA, 2–3% $NH_3$), $cm^3$ | 433.0 | 538.1 | 375.0 | 767.9 |
| Gram | 459.8 | 501.3 | 416.4 | 777.3 |
| Net HA (g) | 183.9 | 200.0 | 166.5 | 310.1 |
| Recycle HA, (23–34%) $cm^3$ | 1438.5 | 1653.6 | 1200.1 | 1079.1 |
| Gram | 1526.6 | 1718.5 | 1284.5 | 1141.2 |
| Net HA (g) | 458.0 | 378.1 | 436.7 | 365.2 |
| Total Recoverable Ha (g) | 1188.3 | 1100.7 | 1149.2 | 1162.0 |
| Net HA produced (g) | 242.8 | 145.9 | 231.3 | 103.9 |
| Efficiency (%) | 42.7 | 25.2 | 40.6 | 18.2 |

Figure 4:
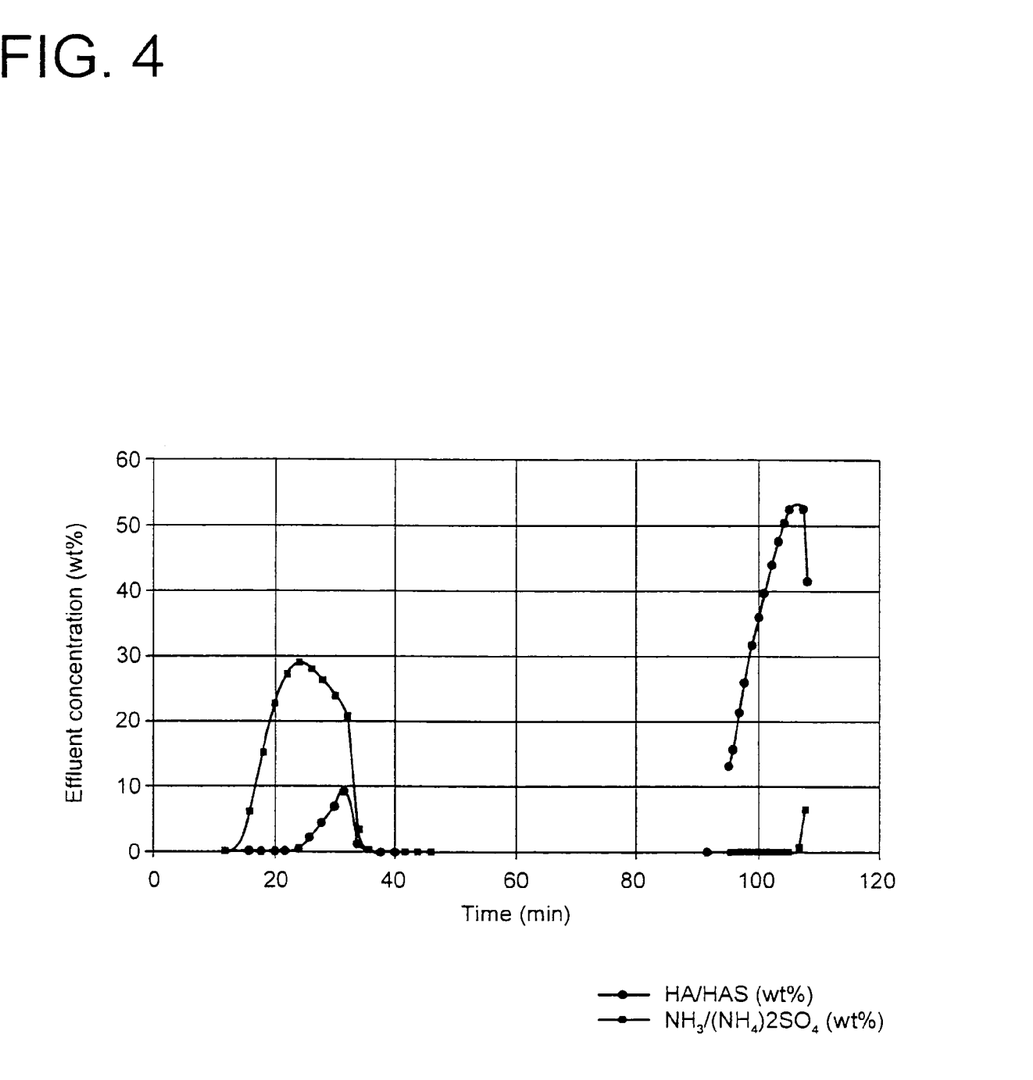
FIG. 4 is a graphical representation of effluent concentration profiles of HA production using the present invention.

Effluent stream samples were collected every two minutes for chemical identification and analysis while products were collected every minute to determine product concentration and yield. Products collected for the four examples are tabulated in Table 2 below while the concentrations of HA and $NH_3$ in the product samples are illustrated in FIG. 4. From the product concentration profile, samples of pure HA averaging 48–50% by weight were combined as the product cut. Product samples that contain pure HA with averaging concentrations at 22–34% were collected as the recycle HA cut. And lastly samples that average HA at 40% and $NH_3$ at 2–3% by weight were combined as the potentially HA recoverable product.

TABLE 2

Product Collected Per Minute ($cm^3$)

| Product Collected @ time (min) | Example | | | |
|---|---|---|---|---|
| | 3 | 4 | 5 | 6 |
| 95 | 242.11 | | | 207.52 |
| 96 | 243.71 | 246.28 | | 199.25 |
| 97 | 217.76 | 251.64 | 230.68 | 206.57 |
| 98 | 207.85 | 244.97 | 232.28 | 227.4 |
| 99 | 176.98 | 245.56 | 224.85 | 238.34 |
| 100 | 156.3 | 231.02 | 211.5 | 230.26 |
| 101 | 193.79 | 203.6 | 205.37 | 225.26 |
| 102 | 192.55 | 230.57 | 193.93 | 228.1 |
| 103 | 199.95 | 230.79 | 192.96 | 226.54 |
| 104 | 213.93 | 245.4 | 192.96 | 263.2 |
| 105 | 187.48 | 258.68 | 203.36 | 243.5 |
| 106 | 212.71 | 245.98 | 203.89 | 261.24 |
| 107 | 207.34 | 224.63 | 209.82 | 253.67 |
| 108 | 225.66 | 313.42 | 199.15 | |
| 109 | | | 197.18 | |
| 110 | | | 207.96 | |
| 111 | | | 186.15 | |
| 112 | | | 188.8 | |

One objective of this invention is a process to manufacture a concentrated hydroxylamine free base with high purity. Table 5, below, summarizes results in parts per billion (ppb) with (ICP-AES) analysis of the starting feed and the HA product produced in Examples 3–6. The table illustrates the capability of this invention to manufacture concentrated HA with ppb level metals from a HAS feed that contains metals at about 1 ppm level.

TABLE 5

Production of a High Purity HA with this Invention

| Metal content (ppb) | HAS feed | Example 3 | Example 4 | Example 5 | Example 6 |
|---|---|---|---|---|---|
| Ca | 710 | <10 | <10 | <10 | <10 |
| Fe | 850 | <10 | 52 | 73 | 70 |
| Na | 1200 | <10 | 60 | 11 | <10 |

Examples 7–13

The recoverable product cut that contains a HA concentration of 38–42% by weight and $NH_3$-concentration of 2–3% by weight was transferred to a 2-liter rotary evaporator. For these examples, about 1200–1400 grams of the solution were first added with 70 ppm of CDTA stabilizer and transferred to the evaporator. A mechanical pump was used to evacuate the system while a condenser in the evaporator was cooled with a water coolant at a temperature of about 4° C. At the end at the stripping process, the concentration of HA was also increased somewhat. Results of the stripping tests are tabulated in Table 3, below. Combining products from both the product cut and the HA recovered from the stripping process, the net product efficiencies increase substantially as shown in Table 4, below.

TABLE 4-continued

Enhanced HA Product Yield Efficiency with a Single 4-inch PFA-lined Column

| | Example | | | |
|---|---|---|---|---|
| | 3 | 4 | 5 | 6 |
| Aqueous $NH_3$ (g) at 50% | 1330 | 1361 | 1330 | 1283 |
| Product (49%), $cm^3$ | 1006.6 | 980.85 | 1017.2 | 910.2 |
| Gram | 1115.0 | 1066.5 | 1114.3 | 993.3 |
| Net HA (g) | 546.4 | 522.6 | 546.0 | 486.7 |
| Recoverable (40% HA, 2–3% $NH_3$), $cm^3$ | 433.0 | 538.1 | 375.0 | 767.9 |
| Gram | 459.8 | 501.3 | 416.4 | 777.3 |
| Net HA (g) | 183.9 | 200.0 | 166.5 | 310.1 |
| Recycle HA, (23–34%) $cm^3$ | 1438.5 | 1653.6 | 1200.1 | 1079.1 |
| Gram | 1526.6 | 1718.5 | 1284.5 | 1141.2 |
| Net HA (g) | 458.0 | 378.1 | 436.7 | 365.2 |
| Total Recoverable Ha (g) | 1188.3 | 1100.7 | 1149.2 | 1162.0 |
| Net HA produced (g) | 426.7 | 345.9 | 397.8 | 414.0 |
| Efficiency (%) | 75.0 | 59.8 | 69.8 | 72.6 |

Examples 14–15

Hydroxylamine solutions manufactured according to the above-mentioned embodiments were treated with a cation-exchange resin in $NH_4^+$-form (Rohm & Haas Amberjet

TABLE 3

Vacuum stripping of $NH_3$ from the product cut that has $NH_3$ contamination

| Example # | Initial HA (wt %) | Initial $NH_3$ (wt %) | Initial wt (g) | Net HA (g) | Final HA (g) | Final wt (g) | Total wt (g) |
|---|---|---|---|---|---|---|---|
| 7 | 41.89 | 3.13 | 1173 | 491.5 | 53.97 | 882 | 881.5 |
| 8 | 41.89 | 3.13 | 1235 | 517.22 | 53.45 | 848 | 1729.7 |
| 9 | 39.48 | 1.97 | 1350 | 532.98 | 55.83 | 733 | 4451.5 |
| 10 | 39.48 | 1.97 | 1239 | 489.32 | 52.67 | 760 | 5211.1 |
| 11 | 39.24 | 2.696 | 1350 | 529.7 | 47.91 | 1060 | 9732 |
| 12 | 39.24 | 2.696 | 1163 | 456.17 | 50.07 | 835 | 10567 |
| 13 | 39.24 | 2.696 | 1229 | 482.34 | 49.33 | 913 | 11479 |

| Example # | Final Net HA (g) | Condensate HA (%) | Condensate $NH_3$ (%) | Condensate (wt) | HA Recovery (%) | Tem. (° C.) | Vacuum (torr) | Time (min) |
|---|---|---|---|---|---|---|---|---|
| 7 | 475.75 | 13.63 | 1.193 | 253.8 | 103.83 | 37–38.5 | 66–12.7 | 90 |
| 8 | 453.36 | 13.63 | 1.193 | 213.5 | 93.28 | 37–38 | 62–12.9 | 90 |
| 9 | 409.46 | 12.61 | 1.106 | 412.2 | 86.58 | 37–38 | 62–12.8 | 140 |
| 10 | 400.08 | 12.61 | 1.106 | 382.8 | 91.63 | 37–38 | 52–12.9 | 120 |
| 11 | 507.8 | 9.65 | 1.2 | 346.7 | 102.18 | 38–39 | 70–13 | 120 |
| 12 | 417.88 | 11.5 | 1.2 | 279.7 | 98.66 | 38.5 | 79–13 | 120 |
| 13 | 450.19 | 12.2 | 1.2 | 264.5 | 100.02 | 35–38.5 | 70–13 | 120 |

TABLE 4

Enhanced HA Product Yield Efficiency with a Single 4-inch PFA-lined Column

| | Example | | | |
|---|---|---|---|---|
| | 3 | 4 | 5 | 6 |
| Resin volume ($cm^3$) | 8617 | 8770 | 8641 | 8641 |
| HA loaded (g) | 568.7 | 578.8 | 570.3 | 570.3 |
| Recycle HA (g) at 34% | 2240 | 2220 | 2210 | 2200 |

1500). The HA solution was stabilized with CDTA at a concentration level of 100 ppm. This solution was pumped at a flow rate of 15 $cm^3$/min into a 1-inch column with 300 $cm^3$ of anion-exchange resin (Rohm and Haas Amberjet 4200). The resin was pretreated with sulfuric acid to remove metals and followed with the exchange of Cl-form into an OH-form. The effluent HA was analyzed with an ICP-MS method (Example 14). Results of the analysis were compared with initial HA solution, the effluent through a cation-exchange resin (Rohm and Haas Amberjet 1500 ($NH_4^+$)) and a 18 Megohm water, are shown in Table 6.

TABLE 6

Summary of ICP Analysis on Samples from Cation/Anion-Exchange Study

| | | Example | | | |
|---|---|---|---|---|---|
| | | 14 | 14 | 15 | 15 |
| | | Sample | | | |
| Metal contents (ppb) | 18 Megohm $H_2O$ | 57% HA | 57% HA purified with the anion-exchange resin of this invention only | 57% HA treated with a cation-exchange resin (R&H 1500 $NH_4^+$)) only | 57% HA treated with a cation-exchange resin (R&H 1500 $NH_4^+$)) first | 57% HA treated with a cation-exchange resin (R&H 1500) and then with this invention |
| Al | <0.20 | 40 | 15.45 | 9.71 | | |
| Sb | <0.10 | | <1.00 | <1.00 | | |
| As | <0.10 | | <1.00 | <1.00 | | |
| Ba | <0.10 | | <1.00 | <1.00 | | |
| Be | <0.10 | | <1.00 | <1.00 | | |
| Bi | <0.10 | | <1.00 | <1.00 | | |
| B | 1.72 | | 14.81 | 28.22 | | |
| Cd | <0.10 | | <1.00 | <1.00 | | |
| Ca | <0.20 | 110 | 20.22 | 85.87 | 61 | <10 |
| Cr | <0.10 | 0.99 | <1.00 | <1.00 | | |
| Co | <0.10 | | <1.00 | <1.00 | | |
| Cu | <0.10 | 99 | 19.11 | 17.29 | | |
| Ga | <0.10 | | <1.00 | <1.00 | | |
| Ge | <0.10 | | <1.00 | <1.00 | | |
| Au | <0.10 | | <1.00 | <1.00 | | |
| Fe | <0.20 | 140 | <1.00 | 114.17 | 170 | <10 |
| Pb | <0.10 | 84 | <1.00 | 6.72 | | |
| Li | <0.20 | | <1.00 | <1.00 | | |
| Mg | <0.29 | 15 | 7.21 | 8.28 | | |
| Mn | <0.10 | <0.5 | <1.00 | <1.00 | | |
| Mo | <0.10 | | <1.00 | <1.00 | | |
| Ni | <0.36 | 5.1 | <1.00 | 5.19 | | |
| Nb | <0.10 | | <1.00 | <1.00 | | |
| K | <0.64 | 330 | 139.81 | 16.17 | | |
| Si | <0.50 | | <1.00 | <1.00 | | |
| Ag | <0.10 | | <1.00 | <1.00 | | |
| Na | 5.40 | 2500 | 1314.42 | 43.12 | <10 | <10 |
| Sr | <0.50 | | <1.00 | <1.00 | | |
| Ta | <0.10 | | <1.00 | <1.00 | | |
| Th | <0.10 | | <1.00 | <1.00 | | |
| Sn | <0.10 | 0.78 | <1.00 | <1.00 | | |
| Ti | <0.10 | | 10.99 | 9.18 | | |
| V | <0.20 | | <1.00 | <1.00 | | |
| Zn | 0.32 | 18 | <1.00 | 32.59 | | |
| Zr | <0.10 | | <1.00 | <1.00 | | |

Repeated addition of the complexation agent and the treatment of the restabilized HA with the anion-exchange resin can further improve the purity of the HA free base. Combination of the treatment with NH4+-form of cation-exchange resin and the anion-exchange resin is illustrated also in Table 6 (Example 15).

Example 16

In the manufacturing of HA free base, a coolant such as propylene glycol is used for the cooling of various process streams. Any leakage of the coolant into the process-stream that contains a concentrated HA may cause undesired effects if metal impurities in the coolant are high. A commercial propylene glycol was analyzed for several key metals and the coolant was added with CDTA and treated with anion exchange resin following the general procedure described in examples 14–15. Results of metal analysis on the initial coolant and samples purified by the present invention are illustrated in Table 7 below. As shown in the table 7, the sample treated with a cation-exchange resin (PG(USP)/+ exchange) still contain high levels of Cu, and Fe. Application of this invention lowers the metals to <10 and 140 ppb respectively for Cu and Fe after three treatments (PG (USP)/+/−/−/− exchange).

TABLE 7

Metal Contents of a commercial Propylene Glycol and Purified Samples

| Metal (ppb) | Sample | | | | |
|---|---|---|---|---|---|
| | PG(USP) as received | PG(USP)/ + exchange | PG(USP)/ +/− exchange | PG(USP)/ +/−/− exchange | PG(USP)/ +/−/−/− exchange |
| Ca | 8800 | 14 | <10 | <10 | 11 |
| Cu | 3600 | 1200 | <10 | <10 | <10 |
| Fe | 22000 | 10000 | 780 | 210 | 140 |
| Ni | 190 | <30 | <30 | <30 | <30 |
| Na | 4500 | <10 | <10 | <10 | 36 |
| Ti | <10 | <10 | <10 | <10 | <10 |

Example 17

In another embodiment of the present invention is the addition of stabilizer CDTA in the recycle stream to enhance the safety of the manufacturing process and the addition of the stabilizer in the product container to improve the safety of product storage and shipping. The stability of the hydroxylamine free base has been studied with an accelerating rate calorimeter (ARC). For the ARC test, about 5 grams of the HA and HA with a stabilizer were introduced into a Pyrex glass test cell after the cell was washed with nitric acid and followed with rinsing by 18 Megohm deionized water. The test cell was sealed in air in the ARC unit with a small headspace. The test cell was equipped with a thermocouple contacting the bottom of the cell. A heater assembly was provided to head the surrounding of the sample cell and maintain the surrounding of the cell at the same temperature of the sample cell. After a uniform temperature was established, a computer software program was initiated for the heat-wait-search protocol. Once a self-heating of the sample was detected, the heating program was started to maintain an adiabatic condition for the test sample. Temperature and pressure data were collected and the self-heat rate was determined.

Figure 5:
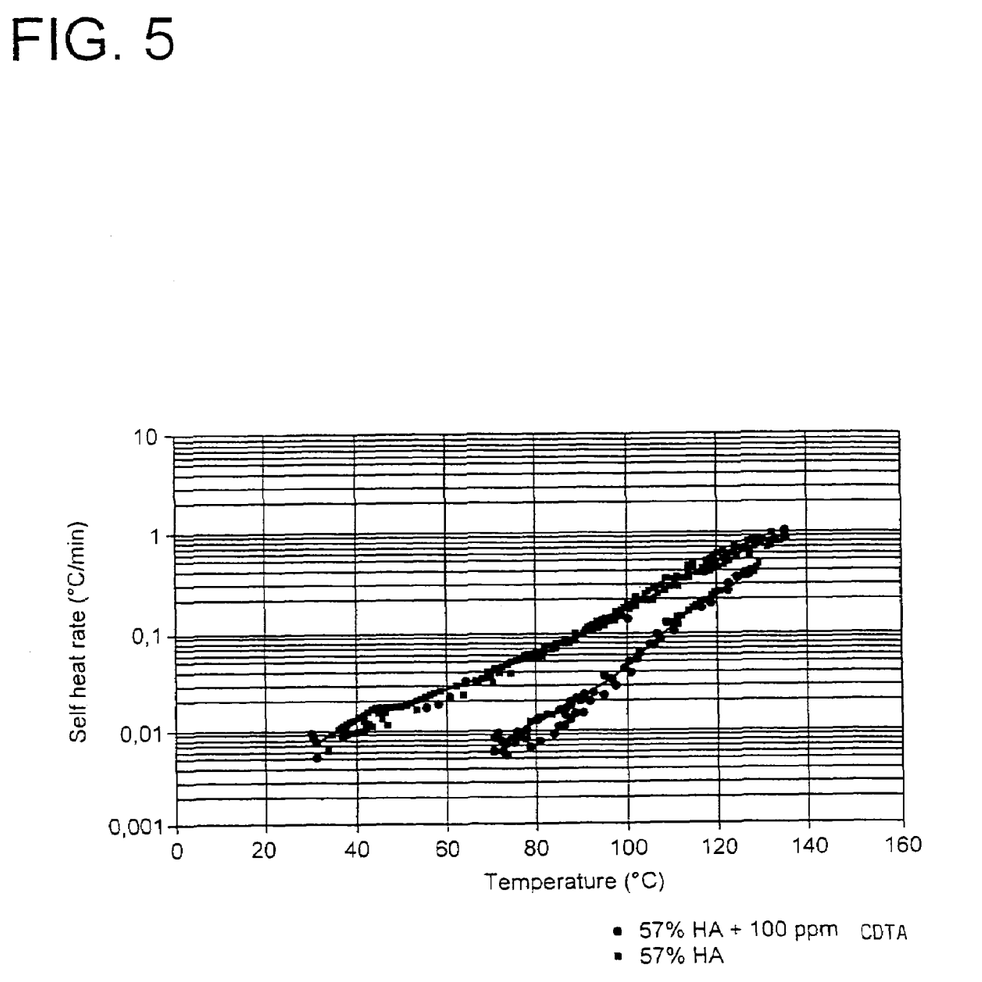
FIG. 5 is a graphical representation illustrating the effect of CDTA stabilizer on the self-heat rate of a 57% by weight HA solution.

A 57% HA free base having an iron metal content of 140 ppb was investigated in an ARC unit. A similar HA solution was added with 100 ppm of CDTA and investigated also with the same ARC unit. Results of the self-heat rate measurement were compared as shown in FIG. 5. This figure illustrates the enhanced stability of the concentrated HA by the addition of a metal chelating agent, CDTA.

The addition of CDTA in the recycle stream will stabilize the concentrated HA in the present process when it is produced. In addition, as the concentrated HA is produced, CDTA was added to enhance the stability of HA upon destined shipping and storage.

I claim:

1. A process for manufacturing hydroxylamine comprising the following steps:
   (a) feeding an aqueous feed solution comprising hydroxylammonium ion and contaminants into a container containing at least one cation exchange resin to form a hydroxylammonium ion loaded resin;
   (b) feeding a water wash into said container to wash said loaded resin to remove said contaminants to form a purified hydroxylammonium ion loaded resin having said wash water associated therewith;
   (c) feeding an aqueous solution comprising hydroxylamine into said container to displace at least a portion of said associated wash water from said purified loaded resin to form a hydroxylamine solution associated resin;
   (d) feeding an aqueous desorbent into said container to desorb said hydroxylammonium ion from said associated resin to form an unbound hydroxylamine containing aqueous solution;
   (e) feeding a rinse water feed into said container to remove said unbound solution from said container to form a pure and concentrated aqueous solution comprising said hydroxylamine,
   and wherein step (c) is conducted prior to step (d).

2. The process as defined in claim 1, wherein steps (a) through (e) are conducted at a column temperature ranging from 50 to 70° C.

3. The process as defined in claim 1, wherein said aqueous feed solution comprises hydroxylamine sulfate.

4. The process as defined in claim 1 wherein said resin is a sulfonated cation exchange resin.

5. The process as defined in claim 1, wherein said desorbent is selected from the group consisting of a monovalent amine base; a monovalent hydroxide base and a mixture of the foregoing.

6. The process as defined in claim 5, wherein the desorbent is aqueous ammonium hydroxide.

7. The process as defined in claim 6, wherein said ammonium hydroxide has a ammonia concentration of at least 40% by weight.

8. The protest as defined in claim 1, wherein said container is an ion exchange resin column and the superficial velocity of said aqueous desorbent and said rinse water added to said column in steps (d) and (a) is less than about 3.5 cm/min.

9. The process as defined in claim 1, which further comprises treating said pure and concentrated solution with a metal chelating agent selected from the group consisting of cyclohexanediamminotetraacetic acid, thiourea, tetramethylthiuram disulfide, 4,8-dihydroxyquinoline-2-carboxylic acid, and a mixture of any of the foregoing agents.

10. The, process as defined in claim 1, wherein during steps (a) through (e), further treating said container to cool said container with a coolant selected from a group consisting of propylene glycol, ethylene glycol, propylene glycol with water, ethylene glycol with water, and a mixture thereof to maintain the temperature of said container at 10 to 70° C.

11. The process as defined in claim 10, wherein, prior to said cooling, said coolant is pretreated with a metal chelating agent selected from a group consisting of cyclohexanediamminotetraacetic acid, thiourea, 4,8-dihydroxyquinoline-2-carboxylic acid, and a mixture of any of the foregoing agents, to bind metal ion contaminants thereto and remove said contaminants from said coolant.

12. The process as defined in claim 1 comprising the following steps:
   (a) feeding an aqueous feed solution including hydroxylammonium ion, hydrogen ions, ammonium ions, metal ions and anion con taminants into an ion exchange column containing at least one sulfonated cation exchange resin;
   (b) baiting the feeding of the aqueous feed solution and starting feeding of water into said ton exchange column when the ion exchange column effluent conductivity exceeds about 200 mMhos/cm to give a first ion exchange column water wash effluent stream;
   (c) halting the water feed of step (b) when the paid exchange column effluent conductivity reaches about 0 mMhos/cm;
   (d) feeding an aqueous hydroxylamine solution into said ion exchange column to displace essentially all of the water of said water feed from said column;
   (e) feeding an aqueous ammonium hydroxide solution having an ammonia concentration of at least 40% into the ion exchange column;
   (f) halting the feeding of said aqueous ammonium hydroxide solution into the ion exchange column when a sufficient amount has been added to completely desorb the hydroxylamine;
   (g) feeding a rinse water feed into the ion exchange column;
   (h) collecting a product stream emanating from the ion exchange column when the effluent density rises above about 1.085 g/cm$^3$ wherein the product stream is an aqueous stream of essentially pure hydroxylamine and essentially no anion contaminants;
   (i) halting the collection of the product stream when effluent density decreases below about 1.075 g/cm$^3$; and
   (j) halting the rinse water feed to the ion exchange column,
   and wherein step (d) is conducted prior to step (e).

13. The process as defined in claim 12, therein steps (a) through (j) are conducted at a column temperature of 10 to 70° C.

14. The process for manufacturing hydroxylamine of claim 12, wherein steps (a) through (j) are repeated in a cyclic process after the rinse water feed is halted in step (j).

15. The process for manufacturing hydroxylamine of claim 14, wherein the process is accomplished in a continuous simulated moving bed ion exchange apparatus.

16. The process as defined in claim 1 using a continuous simulated ion exchange apparatus including at least five ion exchange zones, each ion exchange column loaded with a sulfonated cation exchange resin, comprising the steps:
   (a) feeding an aqueous feed solution including a first concentration of hydroxylammonium ion, hydrogen ions, ammonium ions, metal ions and anion contaminants into a first ion exchange zone to give a sulfonated cation ion exchange resin loaded with hydroxylammonium ion;
   (b) feeding wish water into a second ion exchange zone including a sulfonated cation ion exchange resin loaded with hydroxylammonium ion to give a first ion exchange column water wash effluent stream;
   (c) feeding an aqueous hydroxylamine solution into a third ion exchange zone including a sulfonated cation ion exchange resin having water associated therewith to give a second ion exchange column effluent stream;
   (d) feeding an aqueous ammonium hydroxide solution having an ammonia concentration of at least 40% into a fourth ion exchange zone including a sulfonated cation ion exchange resin having hydroxylammonium ion associated therewith and collecting a third ion exchange zone effluent;
   (e) feeding a rinse water feed into a fifth ion; exchange zone to give a fourth ion exchange zone product stream; and
   (f) collecting the fourth ion exchange zone when the effluent density rises above about 1.085 g/cm$^3$ and stopping the collecting of the fourth ion exchange ions effluent stream when the effluent density decreases to about 1.075 g/cm$^3$ to give an aqueous hydroxylamine product having a second hydroxylamine concentration that is greater than the first hydroxylamine concentration in said aqueous feed solution and including essentially no anion contaminants.

17. The process of claim 1, in which the hydroxylamine product is after-treated using an anion exchange resin.

* * * * *

UNITED STATES PATENT AND TRADEMARK OFFICE
CERTIFICATE OF CORRECTION

| | | |
|---|---|---|
| PATENT NO. | : 7,172,744 B2 | Page 1 of 1 |
| APPLICATION NO. | : 10/487592 | |
| DATED | : February 6, 2007 | |
| INVENTOR(S) | : Chang | |

It is certified that error appears in the above-identified patent and that said Letters Patent is hereby corrected as shown below:

Column 16, indicated line 46: "protest" should read --process.--

Column 16, indicated 49: "(d) and (a)" should read --(d) and (e)--

Column 17, indicated line 7: "con taminants" should read --contaminants--

Column 17, indicated line 10: "baiting" should read --halting--

Column 17, indicated line 11: "ton" should read --ion--

Column 17, indicated line 15: "paid" should read --said--

Column 18, indicated line 15: "wish" should read --wash--

Column 18, indicated line 30: "ion; exchange" should read --ion exchange--

Column 18, indicated line 36: "ion exchange ions" should read --ion exchange zone--

Signed and Sealed this

Twenty-second Day of May, 2007

JON W. DUDAS
*Director of the United States Patent and Trademark Office*